(12) United States Patent
Li et al.

(10) Patent No.: US 12,373,901 B2
(45) Date of Patent: Jul. 29, 2025

(54) METHOD, APPARATUS, DEVICE AND STORAGE MEDIUM FOR CONTENT CAPTURING

(71) Applicant: Beijing Zitiao Network Technology Co., Ltd., Beijing (CN)

(72) Inventors: Jia Li, Beijing (CN); Wanli Che, Beijing (CN); Zhenan Li, Beijing (CN); Qing Song, Beijing (CN); Jianfeng Zhang, Beijing (CN); Jiayi Shen, Beijing (CN); Xuyang Bu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/523,843

(22) Filed: Nov. 29, 2023

(65) Prior Publication Data

US 2024/0104669 A1    Mar. 28, 2024

Related U.S. Application Data

(63) Continuation of application No. PCT/CN2023/092382, filed on May 5, 2023.

(30) Foreign Application Priority Data

Jun. 20, 2022  (CN) .......................... 202210700840.3

(51) Int. Cl.
*G06Q 50/00* (2024.01)
*G06F 3/04842* (2022.01)
(Continued)

(52) U.S. Cl.
CPC ......... *G06Q 50/01* (2013.01); *G06F 3/04842* (2013.01); *H04N 21/4318* (2013.01); *H04N 21/8456* (2013.01)

(58) Field of Classification Search
CPC .......................... G06Q 50/01; G06F 3/04842; H04N 21/4318; H04N 21/8456
See application file for complete search history.

(56) References Cited

U.S. PATENT DOCUMENTS

2014/0096002 A1* 4/2014 Dey .................... G06F 3/04817 715/723
2016/0105388 A1* 4/2016 Bin Mahfooz ..... G06F 3/04817 709/206

(Continued)

FOREIGN PATENT DOCUMENTS

| CN | 108090491 A | 5/2018 |
|----|-------------|--------|
| CN | 108769562 A | 11/2018 |

(Continued)

OTHER PUBLICATIONS

International Search Report issued Aug. 7, 2023 for PCT Application No. PCT/CN2023/092382, English translation (10 pages).

(Continued)

*Primary Examiner* — John R Schnurr

(57) ABSTRACT

Embodiments of the disclosure provide a method, apparatus, device, and storage medium for content capturing. The method includes, presenting a first capturing page corresponding to a single-segment capturing mode to capture a first video segment; in response to an indication of capturing completion being detected while the first capturing page is being presented, presenting a first editing page for editing at least the first captured video segment; and presenting a second capturing page to capture a second video segment based on an indication of new capturing being detected while the first editing page is being presented. In this way, it is possible for users to conduct content creating more easily and quickly, and different capturing requirements can further be met.

20 Claims, 10 Drawing Sheets

(51) Int. Cl.
*H04N 21/431* (2011.01)
*H04N 21/845* (2011.01)

(56) References Cited

U.S. PATENT DOCUMENTS

| | | | | |
|---|---|---|---|---|
| 2018/0234738 | A1* | 8/2018 | Sarkar | H04N 21/2541 |
| 2019/0208289 | A1* | 7/2019 | Singh | H04N 21/8547 |
| 2020/0120265 | A1 | 4/2020 | Brown et al. | |
| 2021/0006710 | A1* | 1/2021 | Li | H04N 23/62 |
| 2021/0051275 | A1* | 2/2021 | Brown | H04N 23/631 |
| 2021/0360215 | A1* | 11/2021 | Hofmann | H04N 9/79 |
| 2021/0375320 | A1* | 12/2021 | Wong | H04N 21/4223 |
| 2022/0005129 | A1* | 1/2022 | Snell | G06F 16/48 |
| 2022/0132223 | A1* | 4/2022 | Wu | G11B 27/28 |
| 2022/0207805 | A1* | 6/2022 | Anvaripour | G06F 16/24573 |
| 2022/0210328 | A1* | 6/2022 | Anvaripour | H04N 5/91 |
| 2022/0210337 | A1* | 6/2022 | Anvaripour | H04N 23/632 |
| 2023/0137850 | A1* | 5/2023 | Sun | G06T 11/60 705/319 |

FOREIGN PATENT DOCUMENTS

| | | |
|---|---|---|
| CN | 109451245 A | 3/2019 |
| CN | 110312077 A | 10/2019 |
| CN | 111464735 A | 7/2020 |
| CN | 112153288 A | 12/2020 |
| CN | 113411490 A | 9/2021 |
| CN | 114025087 A | 2/2022 |
| CN | 307316419 S | 5/2022 |
| CN | 115278051 A | 11/2022 |
| JP | 2021-535656 A | 12/2021 |
| WO | 2022/143253 A1 | 7/2022 |

OTHER PUBLICATIONS

Office Action issued Sep. 12, 2023 in CN Appl. No. 202210700840.3, English translation (21 pages).

Baidu, "How to shoot a TikTok video" cited in the First Office Action in corresponding priority CN application No. 202210700840.3, Available Online at https://jingyan.baidu.com/article/642c9d34ddb881254a46f790.html.

Office action received from Japanese patent application No. 2024-550680 mailed on Mar. 25, 2025, 4 pages (1 pages English Translation and 3 pages Original Copy).

Extended EP Search Report issued Jun. 2, 2025 in EP Appl. No. 23825982.4, 12 pages.

* cited by examiner

METHOD, APPARATUS, DEVICE AND STORAGE MEDIUM FOR CONTENT CAPTURING

This application is a continuation of International Patent Application No. PCT/CN2023/092382, filed on May 5, 2023, which claims priority to Chinese Patent Application No. 202210700840.3 filed on Jun. 20, 2022, and entitled "METHOD, APPARATUS, DEVICE, AND STORAGE MEDIUM FOR CONTENT CAPTURING".

FIELD

Example embodiments of the present disclosure generally relate to the field of multimedia processing, and in particular, to a method, apparatus, device, and computer readable storage medium for content capturing.

BACKGROUND

Currently more and more applications have been designed to provide various services to users. For example, users may browse, comment on, and repost all kinds of content in content-sharing applications, comprising multimedia content such as videos, images, image collections, and sounds. In addition, users creating and posting photos or videos of multimedia content is allowed in content-sharing applications. For application providers, it is desirable that more and more users can participate in content creation and posting. In this way, not only more and richer multimedia content can be provided on platforms, but also user viscosity of applications can be increased.

SUMMARY

In a first aspect of the present disclosure, a method of content capturing is provided. The method comprises: presenting a first capturing page corresponding to a single-segment capturing mode to capture a first video segment; in response to an indication of capturing completion being detected while the first capturing page is being presented, presenting a first editing page for editing at least the first captured video segment; and presenting a second capturing page to capture a second video segment based on an indication of new capturing being detected while the first editing page is being presented.

In a second aspect of the present disclosure, an apparatus for content capturing is provided. The apparatus comprises: a first capturing page presenting module configured to present a first capturing page corresponding to a single-segment capturing mode to capture a first video segment; a first editing page presenting module configured to, in response to an indication of capturing completion being detected while the first capturing page is being presented, present a first editing page for editing at least the first captured video segment; and a second capturing page presenting module configured to presenting a second capturing page to capture a second video segment based on an indication of new capturing being detected while the first editing page is being presented.

In a third aspect of the present disclosure, an electronic device is provided. The electronic device comprises: at least one processing unit; and at least one memory coupled to the at least one processing unit and storing instructions to be executed by the at least one processing unit, the instructions, when executed by the at least one processing unit, causing the electronic device to perform a method in the first aspect.

In a fourth aspect of the present disclosure, a computer readable storage medium is provided, having a computer program stored thereon, the computer program, when executed by a processor, performing a method in the first aspect.

It would be appreciated that the content described in the Summary section of the present disclosure is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

Through the detailed description with reference to the accompanying drawings, the above and other features, advantages, and aspects of each embodiment of the present disclosure will become more apparent. The same or similar reference numerals represent the same or similar elements throughout the figures, wherein.

DETAILED DESCRIPTION

Figure 1:
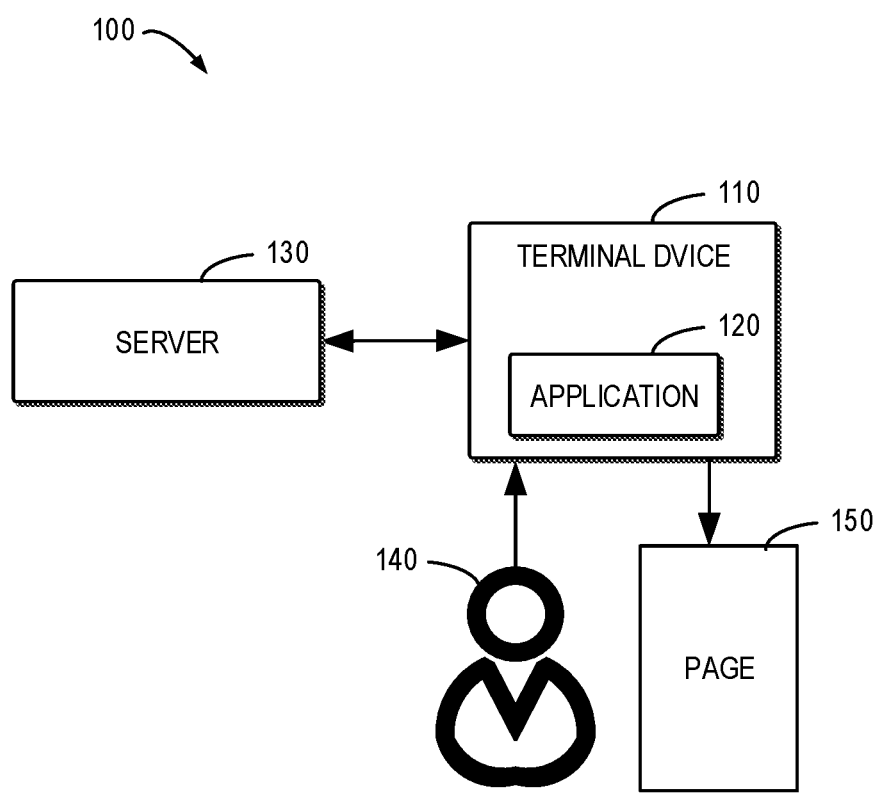
FIG. 1 shows a schematic diagram of an example environment in which the embodiments of the present disclosure can be applied.

The embodiments of the present disclosure will be described in more detail below with reference to the accompanying drawings. Although some embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for a purpose of illustration and are not intended to limit the scope of protection of the present disclosure.

In the description of the embodiments of the present disclosure, the term "comprising" and similar terms should be understood as open inclusion, i.e., "comprising but not limited to". The term "based on" should be understood as "at least partially based on". The term "one embodiment" or "the embodiment" should be understood as "at least one embodiment". The term "some embodiments" should be understood as "at least some embodiments". Other explicit and implicit definitions may also be comprised below.

It is understandable that the data involved in this technical proposal (comprising but not limited to the data itself, data acquisition, use, storage, or deletion) shall comply with the requirements of corresponding laws, regulations, and relevant provisions.

It is understandable that before using the technical solution disclosed in each embodiment of the present disclosure, users shall be informed of the type, using scope, and using scenario of personal information involved in the present disclosure in an appropriate manner, and be authorized by users according to relevant laws and regulations.

For example, in response to receiving a proactive request from a user, prompt information is sent to the user to explicitly remind the user that a requested operation will require the acquisition and use of personal information of the user, so that the user may independently choose, according to the prompt information, whether to provide personal information to electronic devices, applications, servers or storage media and other software or hardware that perform operations of the technical solution of the present disclosure.

As an optional but non-limiting implementation, in response to receiving a proactive request from a user, the way of sending prompt information to the user may be, for example, a popup window, in which the prompt information may be presented in the form of text. In addition, the popup window may further carry a selection control for the user to choose "agree" or "disagree" to provide personal information to electronic devices.

It is understandable that the above process of notifying and obtaining user authorization is only for a purpose of illustration and does not imply any implementations of the present disclosure. Other ways, to satisfy the requirements of relevant laws and regulations, may also be applied to implementations of the present disclosure.

FIG. 1 shows a schematic diagram of an example environment 100 in which the embodiments of the present disclosure can be applied. In the example environment 100, an application 120 is installed on a terminal device 110. A user 140 may interact with the application 120 via the terminal device 110 and/or devices attached to the terminal device 110. The application 120 may be a content-sharing application, that can provide the user 140 with various services related to multimedia content, comprising browsing, commenting on, reposting, creating (e.g., capturing and/or editing), and posting multimedia content. In the present disclosure, the "multimedia content" may be various forms of content, comprising videos, audio, images, image collections, text, and so on.

In the environment 100 in FIG. 1, if the application 120 is in active state, the terminal device 110 may present a page 150 of the application 120. The page 150 may comprise various types of pages which the application 120 can provide, such as multimedia content presenting pages, content creating pages, content posting pages, messaging pages, personal pages and so on. The application 120 may provide a content creating function to capture and/or create multimedia content, so as to enable users to edit captured or uploaded multimedia content, etc. The application 120 may also have a posting function that allows the user 140 to post the created multimedia content.

In some embodiments, the terminal device 110 communicates with a server 130 to implement a provision of services to the application 120. The terminal device 110 may be any type of mobile terminal, fixed terminal or portable terminal, comprising a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camera, a positioning device, a television receiver, a radio broadcasting receiver, an e-book device, a gaming device, or any combination thereof, comprising accessories and peripherals of these devices or any combination thereof. In some embodiments, the terminal device 110 may also support any type of user-specific interface (such as a "wearable" circuit, etc.). The server 130 may be various types of computing systems/servers capable of providing computing power, comprising but not limited to a mainframe, an edge computing node, a computing device in a cloud environment, etc.

It should be understood that the description of the structure and function of the environment 100 is only for purpose of illustration and does not imply any limitations on the scope of the present disclosure.

Usually, some applications, such as content-sharing applications, will provide video and/or image-capturing functions. A variety of capturing modes may be provided to satisfy the multiple creating requirements of users. For example, a single-segment capturing function allows users to click a capturing button to start capturing and click the button again to end capturing, thus completing a one-time video capturing. For another example, a segmented capturing mode allows users to click the capture button to start capturing, click a pause button to pause capturing, and click a stop button to end capturing.

Traditionally, layouts of the function buttons in the single-segment and segmented capturing modes tend to be different, thus requiring users to start capturing after completing mode selection. In this case, some users lose will to create and post content due to cumbersome steps of the mode selection, or because they could not proficiently grasp the use of function buttons. For applications that involve content sharing, it is desirable that users will create and post more content. Therefore, it is expected to provide convenience for users to create content, so that users may participate in content creation more conveniently and actively while different capturing requirements may be satisfied.

According to the embodiments of the present disclosure, an improved solution for content capturing is proposed. In the solution, a capturing page for single-segment capturing is presented when capturing is started. After the capturing in the capturing page is completed, an editing page is entered for editing the captured video segment. The editing page also supports instructions for adding a new capture (or continuing a capture). If such instructions are received, the capturing page is presented to capture another video segment.

In this way, users are not only allowed to quickly capture a video and enter the editing page to continue work edition, but also allowed to return through the editing page to continue capturing more video segments as demanded. In other words, when capturing is started, different modes of capturing are allowed based on requirements. Such a capturing process reduces user operation complexity, greatly improves user experience, enables users to create content more conveniently and quickly, and can further satisfy different capturing requirements.

The following will continue to refer to the accompanying drawings to describe some example embodiments of the present disclosure.

Figure 2A:
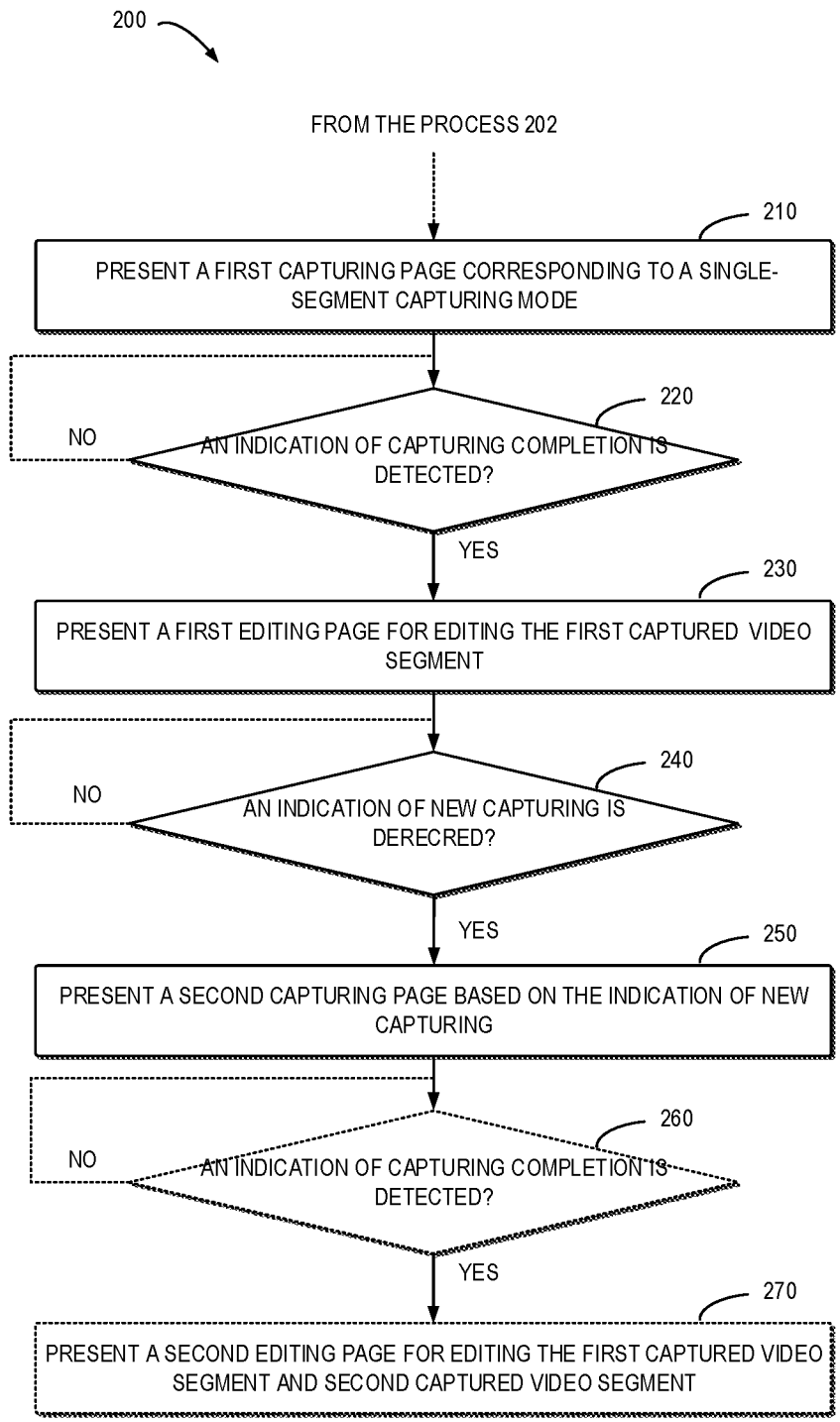
FIG. 2A shows a flowchart of a process for content capturing according to some embodiments of the present disclosure.

FIG. 2A shows a flowchart of a process 200 for content capturing according to some embodiments of the present disclosure. The process 200 may be implemented at the terminal device 110. For the sake of discussion, the process 200 will be described with reference to the environment 100 in FIG. 1.

At block 210, the terminal device 110 presents a first capturing page corresponding to a single-segment capturing mode to capture a first video segment.

In the present disclosure, the "single-segment capturing mode" refers to controlling a start and end of capturing in the capturing page, which will capture a single video segment. The "single-segment capturing mode" is sometimes referred to as "one take" capturing mode. What is different from the "single-segment capturing mode" is the "multi-segment capturing mode." In a capturing page corresponding to the "multi-segment capturing mode," multiple video segments may be obtained by controlling multiple starts and pauses of capturing.

In some embodiments, the application 120 installed on the terminal device 110 may provide a capturing function. By a trigger on the capturing function, the first capturing page may be entered for video capturing. In some embodiments, the capturing starting process will be described with reference to a process 202 of FIG. 2B. The process 202 may also be implemented at the terminal device 110.

At block 215 of the process 202, the terminal device 110 detects a capturing start instruction. The capturing start instruction is used to trigger a capturing start page in order to start the capturing. At block 225, in response to the capturing start instruction, the terminal device 110 presents a capturing start page, which comprises at least a capturing control.

In some embodiments, with respect to the application 120, the terminal device 110 may detect the capturing start instruction in the application 120 and present the capturing start page of the application 120 where the capturing start instruction is detected.

In some embodiments, a capturing start control may be provided in a page currently presented by the application 120. In response to detecting a trigger on the capturing start control, the capturing start instruction may be detected. The way of the trigger on the capturing start control may, for example, comprise clicking on or selecting the capturing start control, trigger by other means such as voice, and so on. In some embodiments, besides the trigger on the capturing start control, or alternatively, the capturing start instruction may be triggered in other ways. The other trigger ways may, for example, comprise without limitation, a voice control instruction, a trigger on hardware keys, specific gestures on a particular page (e.g., swipe gestures), and so on. The embodiments of the present disclosure are not limited in this regard.

For a better understanding of embodiments of the present disclosure, description is given below with reference to an example page.

Figure 3A:
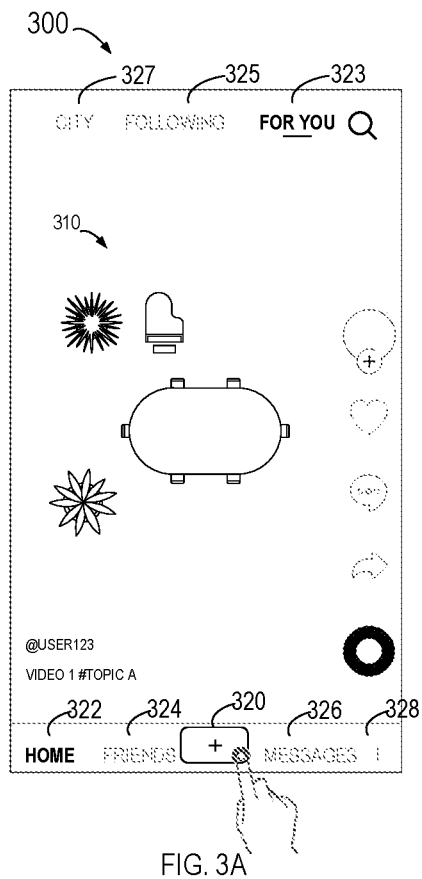
FIG. 3A to FIG. 3J show schematic diagrams of example pages related to content capturing and editing according to some embodiments of the present disclosure.

FIG. 3A shows an example page 300 of the application 120. The page 300 may be any page of the application 120. In the example of FIG. 3A, the page 300 is a content presenting page, wherein a video 310 is presented. The page 300 comprises a capturing start control 320 for a trigger on a presenting of the capturing start page in order to start a capturing.

In addition to the capturing start control 320, the page 300 further comprises a navigation tab bar for navigating to different pages. The "Lower Navigation Tab Bar" located in the lower part of the page 300, comprises navigation tabs 322, 324, 326 and 328. The navigation tab 322 has characters "Home" indicating that the navigation tab corresponds to the home page of the application 120; the navigation tab 324 has characters "Friends" indicating that the navigation tab corresponds to a friend content page of the application 120; the navigation tag 326 has characters "Messages" indicating that the navigation tag corresponds to a message page of the application 120; the navigation tag 328 has character "I" indicating that the navigation tag corresponds to the user's personal page. The "Upper Navigation Tab Bar" located in the upper part of the page 300 comprises the next level of navigation tabs to the navigation tab 322, namely navigation tabs 323, 325 and 327. The navigation tab 323 has characters "For You" indicating a recommended content page, wherein recommended content of the application 120 may be presented; the navigation tab 325 has characters "Following" indicating a followed content page, wherein the content of followed users may be presented; the navigation tab 327 has characters "City" indicating a predefined region (for example, a certain city) content page. The page 300 corresponds to the page of the navigation tab "For You" 323 under the navigation tab "Home" 322, wherein the recommended content, i.e., the video 310, is presented.

It should be understood that the page 300 in FIG. 3A and pages in other figures to be described below are only example pages, and a variety of page designs may actually exist. Each graphic elements of the page may have different arrangements and different visual representations, wherein one or more of these elements may be omitted or replaced, and one or more other elements may also exist. The embodiments of the present disclosure are not limited in this regard. It should also be understood that in addition to the page 300 of the example, the capturing start control may be presented in other pages of the application 120, and/or the capturing start instruction may be started by other means.

Figure 3B:
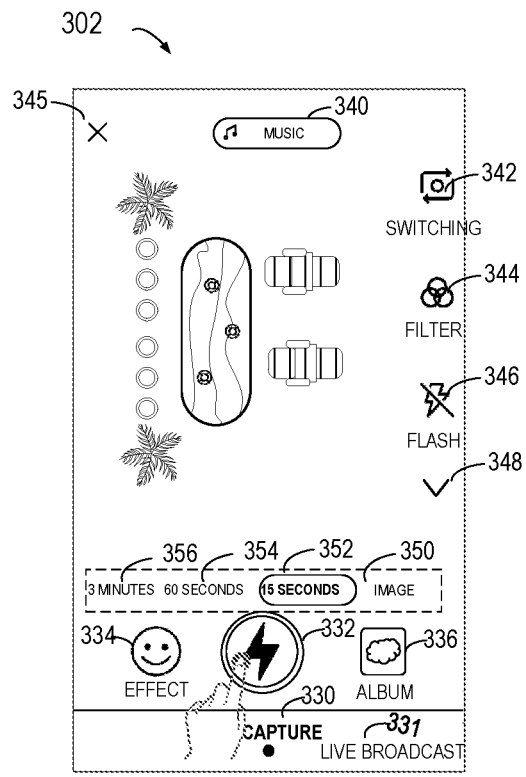

In the page 300, if a user triggers (for example, clicks on) the capturing start control 320, the terminal device 110 will detect the capturing start instruction, and present the capturing start page. FIG. 3B shows an example capturing start page 302, which comprises a capturing start control 332.

In some embodiments, the capturing start page may further provide other controls for controlling content capturing. As an example, in FIG. 3B, the capturing start page 302 may comprise: an effect control 334 for providing special visual effects added in video capturing or other content capturing; an album element 336 for accessing multimedia content in local or other data sources for subsequent creation. In addition, the capturing start page 302 may further provide: a music selection function 340 for selecting music to be posted with a video or image to be captured subsequently; a lens switch function 342 for switching between the front or rear lens of a camera used for capturing; a filter function 344 to apply filters with one or more effects to videos or images captured subsequently; and a flash control function 346 for turning the flash on or off. More functions may be provided in the capturing start page 302, which are hidden and may be unfolded by an unfolding element 348. It should be understood that the functions shown here are only examples, more, less, or other functions may be provided in the capturing start page, and the embodiments of the present disclosure are not limited in this regard.

In some examples, the capturing start page 302 corresponds to a capturing entry 330, and other camera-related functional entries may also be provided therein, such as a live broadcast entry 331 shown in FIG. 3B. If the selection of the live broadcast entry 331 is detected, a live broadcast page will be switched to. In some examples, the capturing start page 302 further provides an exit option 345. If it is detected that the user has selected the exit option 345, the capturing start page 302 may be switched back to the previous page 300.

At block 235 of the process 202, the terminal device 110 detects a trigger instruction for the capturing control in the capturing start page. The trigger on the stop control may, for example, click on or select the capturing control, trigger by other means such as voice, and so on. In the capturing start page, the terminal device 110 may periodically or otherwise detect whether the capturing control is triggered.

Figure 3C:
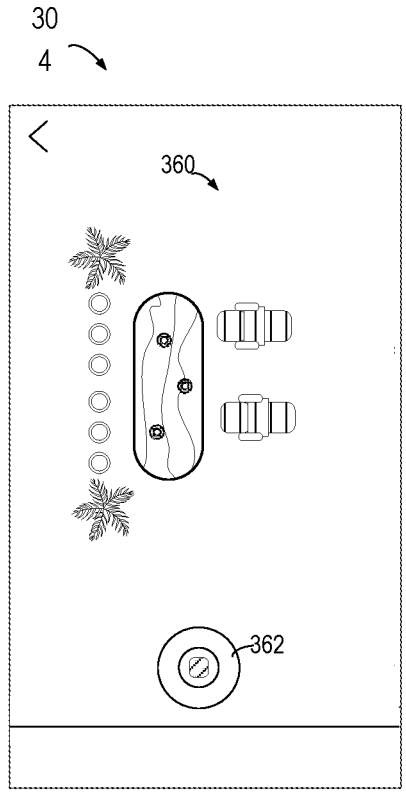

In response to detecting a trigger instruction for the capturing control while the capturing start page is being presented, the terminal device 110 presents a first capturing page corresponding to a single-segment capturing mode, i.e., to the block 210 of the process 200. Thus, the capturing start page is switched to the capturing page for video capturing. For example, if the trigger on the capturing control 332 in the capturing start page 302 in FIG. 3B is detected, the capturing start page 302 is switched to a capturing page 304 as shown in FIG. 3C, in which a single video segment 360 may be captured.

Figure 3D:
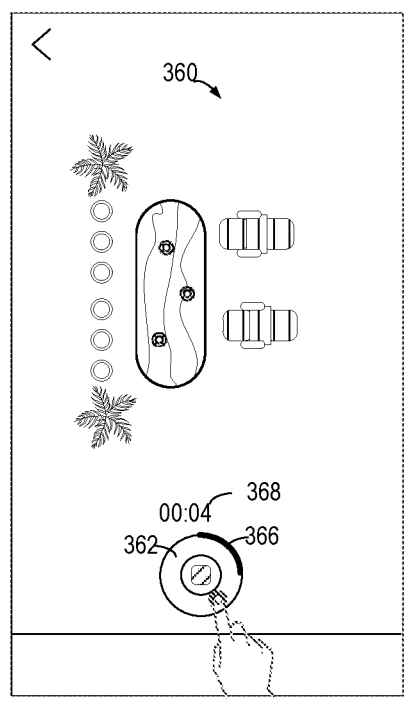

As the capturing proceeds, in some embodiments, an indication of the capturing progress may further be presented in the capturing page 304. As shown in FIG. 3D, a capturing progress bar 366 and a duration indicator 368 may be presented, both indicating the length of a currently captured video segment, e.g., 4 seconds.

Continuing back to the process 200 in FIG. 2A, at block 220, the terminal device 110 determines whether an indication of capturing completion is detected while the first capturing page is being presented.

In some embodiments, the first capturing page may comprise a capturing stop control, a trigger on which may trigger an indication of capturing completion. The way of a trigger on the capturing stop control may, for example, comprise clicking on or selecting the capturing stop control, trigger by other means such as voice, and so on. In some embodiments, after switching from the capturing start page to the capturing page, for example, after the first capturing page, the capturing stop control in the first capturing page may be obtained by deforming the capturing control. In such an implementation, the user triggers the capturing control for capturing and may trigger the capturing stop control again in almost the same position to complete the video capturing. In other words, the user only needs two simple trigger operations to complete the capturing.

As shown in FIG. 3C and FIG. 3D, a capturing stop control 362 is presented in the example capturing page 304. The capturing stop control 362 is deformed from the capturing control in the capturing start page 302 and is in roughly the same position as the capturing control 332. In the example, the capturing stop control 362 is also presented in the lower center of the page for easier user operation.

In some embodiments, in addition to the trigger on the capturing stop control, or alternatively, an indication of capturing completion may be triggered in other ways. Other trigger ways may, for example, comprise, but are not limited to, voice control instructions, a trigger on hardware keys, specific gestures on a particular page (e.g., swipe gestures), and so on. The embodiments of the present disclosure are not limited in this regard.

If no indication of capturing completion is detected in the first capturing page, presenting of the first capturing page may be maintained, and may periodically or otherwise continue to detect an indication of capturing completion. If other indication is detected in the first capturing page, a corresponding operation may be performed according to the instruction.

In response to an indication of capturing completion being detected while the first capturing page is being presented, at block 230 of the process 200, presenting a first editing page for editing at least the first captured video segment.

In the embodiments of the present disclosure, in the capturing page corresponding to the single-segment capturing mode, the editing page is entered once capturing is completed to edit and subsequently post a work. For users with the "one take" capturing requirement, work creation and posting may be quickly completed. In some application scenarios, more users might prefer to complete the video capturing at once so as to post the work as soon as possible. Therefore, after starting capturing, a capturing page, corresponding to the single-segment capturing mode is provided, may allow these users to complete work creation conveniently and quickly. In addition, this may further improve users' motivation for content creating and post.

Figure 3E:
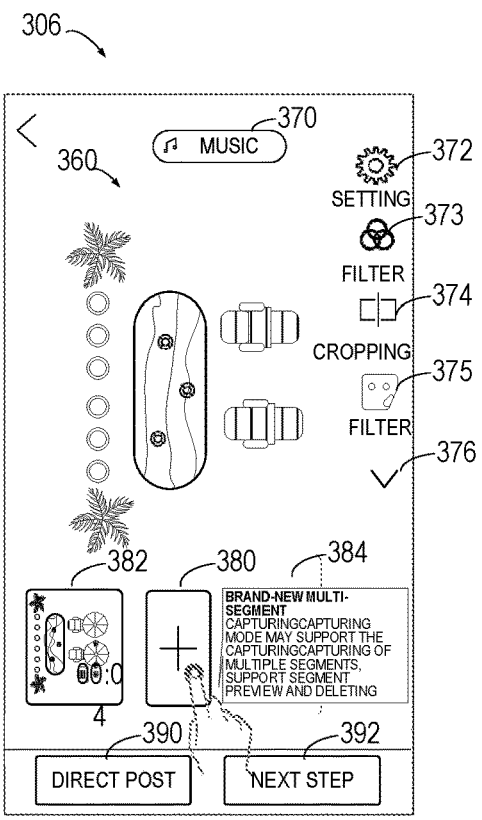

For example, if a trigger on the capturing stop control 362 in the capturing page 304 of FIG. 3D is detected, the capturing page 304 is switched to an editing page 306 as shown in FIG. 3E. In the editing page 306, the captured video segment (for example, the video segment 360) may be edited.

The editing page may provide one or more editing functions that the user can choose to apply to the video segment to be edited. In the example in FIG. 3E, a music selection function 370 is presented for selecting music. The editing page 306 further provides: a setting function 372 for providing one or more setting options; a filter function 373 for applying filters with one or more effects; a cropping function 374 for cropping one or more frames of a video; and a sticker function 375 for adding one or more stickers. The editing page 306 may further provide more editing functions that are hidden and may be unfolded by an unfolding element 376. It should be understood that the editing functions shown here are only examples and that more, less, or other editing functions may be provided, and the embodiments of the present disclosure are not limited in this regard.

In some embodiments, the editing page may also present a posting control for use in triggering a posting control for a captured video. In response to an indication of posting being detected while the editing page is being presented, the captured video is posted. For example, in FIG. 3E, a direct posting control 390 is presented in the editing page 306, a trigger on which will cause the video segment 360 or edited video segment 360 to be posted immediately. In some examples, after posting the video, the editing page 306 is switched to the content presenting page of the application 120. In the example in FIG. 3E, the editing page 306 further presents a posting control 392. In response to the trigger instruction of the posting control 392, the editing page 306 will be switched to the posting page (not shown), wherein the user can enter more content, such as text, tags, etc., to be posted with the video segment 360 or edited video segment 360.

In some embodiments, a segment identifier of the captured video segment may further be presented in the editing page. The segment identifier may, for example, indicate a thumbnail of the corresponding video segment, such as a certain video frame in the segment. In some embodiments, the segment identifier may further indicate the duration information of the corresponding video segment. As shown in FIG. 3E, a segment identification 382 of the captured video segment 360 is presented in the editing page 306. By providing the segment identifier, operations such as preview, and deletion of the corresponding video segment may be supported. This will be described in more detail below.

As mentioned above, by controlling a start and end of the capturing in the capturing page corresponding to the single-segment capturing mode, it is possible to complete the "one take" video capturing, and quickly go to a page for the subsequent processing of the video, such as the editing page and the subsequent posting page. For users who have a requirement of quick sharing and "one take" capturing, convenient capturing entries and convenient operations may be provided.

In some cases, some users might have a requirement of capturing multiple video segments. To support such a capturing requirement, in the embodiments of the present disclosure, a trigger on the continuation of capturing in the editing page is allowed. Returning to the process 200 in FIG. 2A, at block 240, the terminal device 110 determines whether an indication for new capturing has been detected while the first editing page is being presented.

In some embodiments, the first editing page may comprise a new capturing control, a trigger on which may trigger an indication for adding capturing. The trigger on the stop control may, for example, click on or select the capturing control, trigger by other means such as voice, and so on. In some embodiments, in addition to the trigger on the new capturing control, or alternatively, an indication of the completion of the capturing may be triggered in other ways, which may, for example, comprise, but are not limited to, voice control instructions, a trigger on hardware keys, specific gestures on a particular page (e.g., swipe gestures), and so on. The embodiments of the present disclosure are not limited in this regard.

As shown in FIG. 3E, a new capturing control 380 is presented on the example editing page 306. A trigger on the new capturing control 380 will indicate that the user expects to continue capturing more video segments, i.e., using the multi-segment capturing mode.

In some embodiments, guidance information about the multi-segment capturing mode may be provided in the editing page to cause the user to learn about the use of the function of capturing multiple video segments. For example, in FIG. 3E, a prompt window 384 is provided in the editing page 306, which contains text guidance information to guide the user using multi-segment capturing mode. In some embodiments, such guidance information may be provided when such an editing page is first presented to the user, or it may be provided each time the capturing of the first video segment is completed. The scope of the embodiments of the present disclosure is not limited in this regard.

If no indication of a new capturing is detected in the first editing page, presenting of the first capturing page may be maintained and the indication of a new capturing may be detected periodically or otherwise. If other indications are detected in the first editing page, corresponding operations may be performed accordingly.

If the indication for a new capturing is detected while the first editing page is being presented, in block 250 of the process 200, based on the indication of new capturing, the terminal device 110 presents a second capturing page to capture a second video segment.

In some embodiments, in response to detecting the indication of new capturing while the first editing page is being presented, the terminal device 110 switches from the first editing page to the second capturing page to begin to capture the second video segment.

In some embodiments, in response to detecting the indication of new capturing while the first editing page is being presented, the terminal device 110 presents the second capturing start page. In the capturing start page, the user is allowed to trigger the capturing of a second video segment. In some embodiments, the second capturing start page may comprise at least a capturing control for triggering a capturing of the second video segment.

Figure 3F:
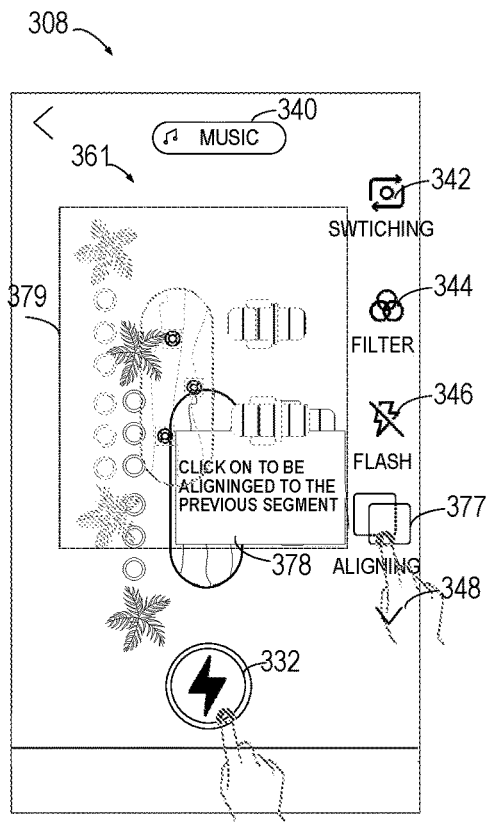

For example, if a trigger on the new capturing control 380 is detected in the editing page 306 of FIG. 3E, a capturing start page 308 is presented as shown in FIG. 3F. The capturing start page 308 comprises the capturing control 332 for triggering the capturing of the second video segment. In addition, the capturing start page 308 may further comprise some functions similar to the capturing start page 308, such as the music selection function 340, the lens switch function 342, the filter function 344, the flash control function 346, the unfolding element 348 for unfolding hidden functions, etc.

In some embodiments, a segment alignment function may further be provided in the second capturing start page. For example, a segment alignment function 377 is further provided in the capturing start page 308 in FIG. 3F. A trigger on the segment alignment function may trigger the indication of segment alignment, so that an alignment identifier may be presented in the capturing start page to help align a currently captured object to an object captured in the previous video segment. As shown in FIG. 3F, if the segment alignment function 377 is selected, an alignment identifier 379 of an object in the previously captured video segment 360 may be presented, the alignment identifier 379 presents the previous video segment 360 in the form of a transparent wire frame so that the user may, for example, align objects in a current scene to corresponding objects in the previous video segment 360 by moving the capturing device. By providing the segment alignment function, users may maintain picture continuity between multiple video segments as required, when capturing multiple video segments.

In some embodiments, guidance information about the segment alignment function may be provided in the capturing start page to cause the user to learn about the use of the segment alignment function. For example, in FIG. 3F, a prompt window 378 is provided in the capturing start page 308, which contains text guidance information to guide the user to use the segment alignment function. In some embodiments, such guidance information may be provided when such a segment alignment function is first presented to the user, or it may be provided each time the capturing start page is entered from the editing page. The scope of the embodiments of the present disclosure is not limited in this regard.

While the second capturing start page is being presented, if a trigger on the capturing control is being detected (for example, the trigger on the capturing control 332 in FIG. 3F), while the second capturing start page is being presented, presenting the second capturing page In some embodiments, similar to the first capturing page, the second capturing page is a capturing page corresponding to the single-segment capturing mode. In the capturing page, the capturing of the second video segment may be completed by controlling a start and end of the capturing.

Figure 3G:
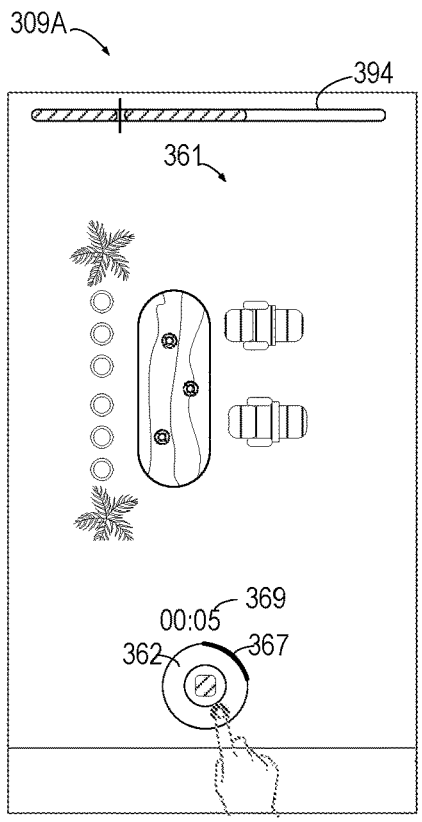

For example, if the trigger on the capturing control 332 is detected in the capturing start page 308 of FIG. 3F, the capturing start page 308 is switched to a capturing page 309A as shown in FIG. 3G. A single video segment 361 may be captured in the capturing page 309A. For example, the capturing page 309A comprises a capturing stop control 362, the trigger on which will trigger an indication to stop capturing. In other words, after returning from the editing page to continue capturing, each capturing may perform the "one take" capturing mode to complete capturing a single video segment.

As the capturing proceeds, in some embodiments, an indication of the capturing progress may further be presented in the second capturing page to indicate the capturing progress of the second video segment. As shown in FIG. 3G, a capturing progress bar 367 and a duration indicator 369 may be presented, both indicating the length of the currently captured video segment 361, e.g., 4 seconds.

In some embodiments, additionally or alternatively, an indication of the remaining capturing duration may be presented in the second capturing page. In some embodiments, after the capturing function is activated, a duration upper limit, also known as an upper limit of video duration, is set for the duration of a video to be captured. The remaining capturing duration is determined based on a difference between the upper limit of video duration and the total length of the captured video segments. As shown in FIG. 3G, a progress bar 394 is provided in the capturing page 309A for the total capturing duration. The progress bar advances as the capturing proceeds, wherein the remaining length may indicate the remaining capturing length. Through the indication of the remaining capturing length, the user may notice the time remaining to capturing, thus adjusting the capturing tempo.

In some embodiments, a selection of capturing mode may be provided in the capturing start page triggered by the indication for capturing start. For example, in the capturing start page 304 shown in FIG. 3B, the image capturing mode 350 and multiple video capturing modes 352, 354, and 356 may be indicated. If the image capturing mode 350 is selected, an image capturing instruction may be detected to control image capturing. One or more video capturing modes may have video duration upper limit per se, which are used to limit the maximum total duration of a video captured in each mode. For example, the upper limit of video duration of the video capturing mode 352 is 15 seconds, the upper limit of video duration of the video capturing mode 354 is 30 seconds, and the upper limit of video duration of the video capturing mode 356 is 3 minutes. Note that the upper limit of video durations here are examples only. In different applications, other upper limit of video durations may be provided as required, and the selection of more or less upper limits of video durations may be provided.

In some embodiments, in addition to providing a video capturing mode with an upper limit of video duration, or alternatively, other video capturing modes may further be provided, such as a video capturing mode with a specific visual effect. The embodiments of the present disclosure are not limited in this regard.

In some embodiments, a target video capturing mode may be determined based on user selection. In some embodiments, a default target video capturing mode may be provided. For example, in FIG. 3B, the video capturing mode 352 with an upper limit of video duration of 15 seconds may be set as the default target video capturing mode. The user may also select other video capturing modes 354 or 356 as required. After selecting the target video capturing mode and starting the capturing (for example, after triggering the capturing control 332 in the capturing start page 302), regardless of whether a single video segment or multiple video segments will be subsequently captured, the total length of the captured video segment(s) shall not exceed the upper limit of video duration corresponding to the target video capturing mode.

In some embodiments, multiple video capturing modes corresponding to different upper limits of video durations may not be set, but a default upper limit of video duration for video capturing may be set, for example, 3 minutes. In this way, the user is allowed to capture a single video segment or multiple video segments of any length within 3 minutes as required.

In some embodiments, based on requirements of the application, the second capturing page may be a capturing page corresponding to the multi-segment capturing mode, in which multiple video segments may be captured by controlling a pause and restart of the capturing. Considering that the user may prefer multi-segment capturing in the case of an instruction to start new capturing in the editing page, thus a capturing page that supports multi-segment capturing may be provided.

Figure 3H:
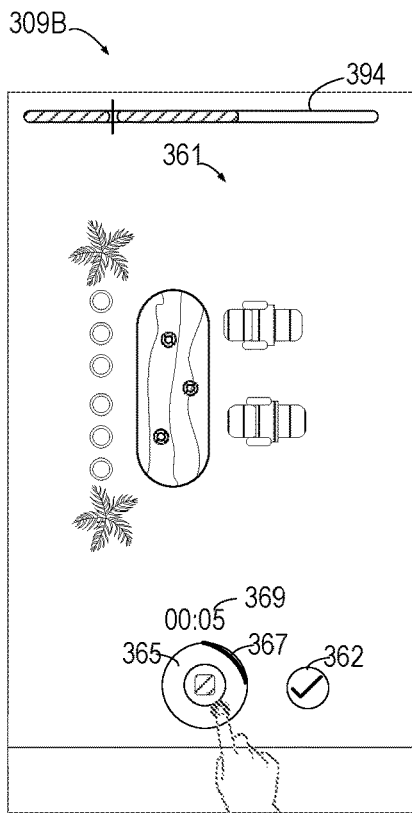
Figure 3I:
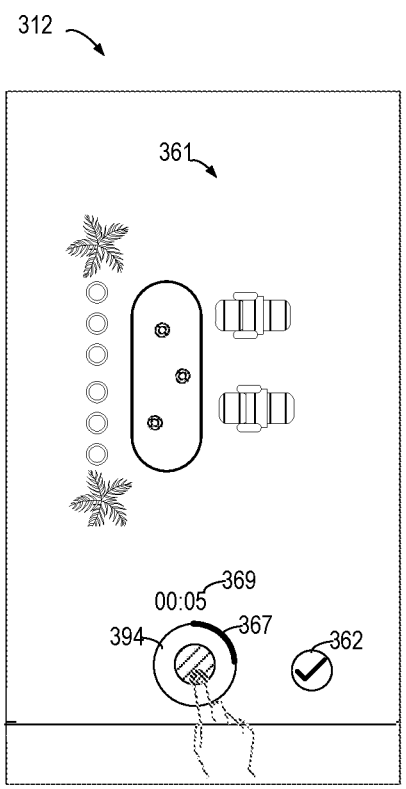
Figure 3J:
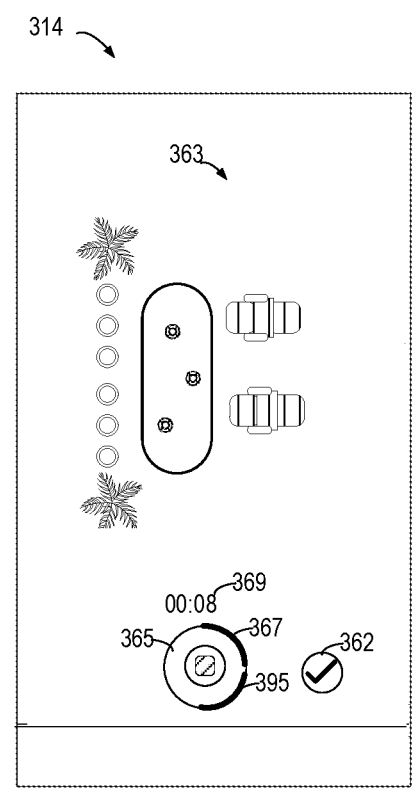

For example, if the trigger on the capturing control 332 is detected in the capturing start page 308 of FIG. 3F, the capturing start page 308 is switched to a capturing page 309B as shown in FIG. 3H. The capturing page 309B corresponds to the multi-segment capturing mode. The capturing page 309B comprises a capturing pause control 365 and a capturing stop control 362. In response to a trigger instruction for the capturing pause control 365 being detected while the capturing page 309B is being presented, a capturing pause page 312 as shown in FIG. 3I is presented, wherein a capturing restart control 394 and a capturing stop control 362 are presented. In response to a trigger instruction for the capturing restart control 394 being detected while the capturing pause page 312 is being presented, a capturing page 314 as shown in FIG. 3J is presented to continue capturing another video segment 314. On the capturing page 314, a capturing progress bar 395 is provided for the video segment 314, and the duration indicator 369 indicates the total length of the two video segments (video segments 361 and 363) currently captured, for example, 8 seconds.

In some embodiments, at block 260 of the process 200, the terminal device 110 may determine whether an indication of capturing completion has been detected while the second capturing page is being presented.

In some embodiments, the second capturing page may comprise a capturing stop control, a trigger on which may trigger an indication of capturing completion. The way of triggering the capturing stop control may, for example, comprise clicking on or selecting the capturing stop control, trigger by other means such as voice, and so on.

In some embodiments, after switching from the second capturing start page to the second capturing page, the capturing stop control in the second capturing page may be obtained by deforming the capturing control in the second capturing start page. In such an implementation, the user triggers the capturing control to capture and may trigger the capturing stop control again in almost the same position to complete video capturing. In other words, the user only needs two simple trigger operations to complete the capturing.

As shown in FIGS. 3G and 3H, the capturing stop control 362 is presented in the example capturing pages 309A and 309B. In the example of FIG. 3G, the capturing stop control 362 is deformed from the capturing control in the capturing start page 302 and is in roughly the same position as the capturing control 332. In the example, the capturing stop control 362 is also presented in the lower center of the page, making it easier for the user to operate. In the example shown in FIG. 3H, the capturing stop control 362 is a control independent of the capturing pause control 365. By a trigger on the capturing stop control 362, an indication of capturing completion for the second video segment may be triggered.

In some embodiments, in addition to the trigger on the capturing stop control, or alternatively, an indication of capturing completion may be triggered in other ways. Other trigger ways may, for example, comprise, but are not limited to, voice control instructions, a trigger on hardware keys, specific gestures on a particular page (e.g., swipe gestures), and so on. The embodiments of the present disclosure are not limited in this regard.

If no indication of capturing completion is detected in the second capturing page, presenting of the second capturing page may be maintained, and may periodically or otherwise continue to detect an indication of capturing completion. If other indication is detected in the second capturing page, a corresponding operation may be performed according to the instruction.

Figure 4A:
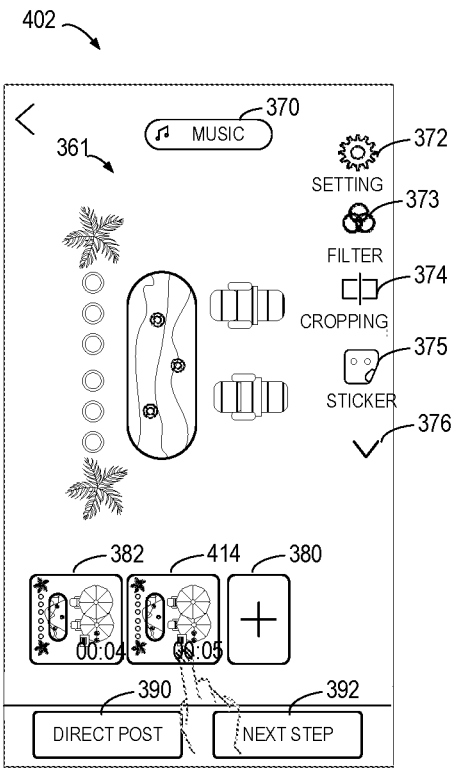
FIG. 4A to FIG. 4H show schematic diagrams of example pages related to content capturing and editing according to other embodiments of the present disclosure.

In some embodiments, at block 270, in response to an indication of capturing completion being detected while the second capturing page is being presented, the terminal device 110 presents a second editing page for at least editing the first captured video segment and the second captured video segment. For example, if a trigger on the capturing stop control 362 is detected in the capturing page 309A of FIG. 3G or the capturing page 309B of FIG. 3H, an editing page 402 as shown in FIG. 4A is presented, in which the currently captured video segments, such as the video segments 360 and 361, may be edited.

In some embodiments, the second editing page may comprise a new capturing control, a trigger on which may trigger an indication to add capturing. The way of trigger on the new capturing control may be the same as the that of trigger on the new capturing control in the first editing page. As shown in FIG. 4A, a new capturing control 380 is presented in the editing page 402. A trigger on the new capturing control 380 will indicate that the user also expects to continue capturing more video segments, i.e., using the multi-segment capturing mode. By starting the indication to add capturing in the editing page, more video segments may be captured.

In some embodiments, similar to the first editing page, a segment identifier of a captured video segment may also be presented in the second editing page. For example, the segment identifier of the captured video segment may be presented in the editing page 402 of FIG. 4A, comprising the segment identifier 382 of the video segment 360 and a segment identifier 414 of the video segment 362.

As mentioned above, the interactive operation of video segments, such as preview and deletion, may be implemented by editing the segment identifiers of the video segments in the page. Illustration is given below by taking the interaction of segment identifiers of video segments in the second editing page as an example. The interaction for segment identifiers to be described below may also be applied to editing pages for presenting a segment identifier of a single video segment, such as the editing page 306 as shown in FIG. 3E.

In some embodiments, a corresponding video segment may be previewed by selecting the segment identifier. Specifically, in response to detecting a selection indication for a certain segment identifier, a preview window for the corresponding video segment is presented. In this preview window, a positioning indicator for the video segment may be provided. Based on the positioning indicator, the video picture in the video segment corresponding to the positioning indicator is presented in the editing page.

Figure 4B:
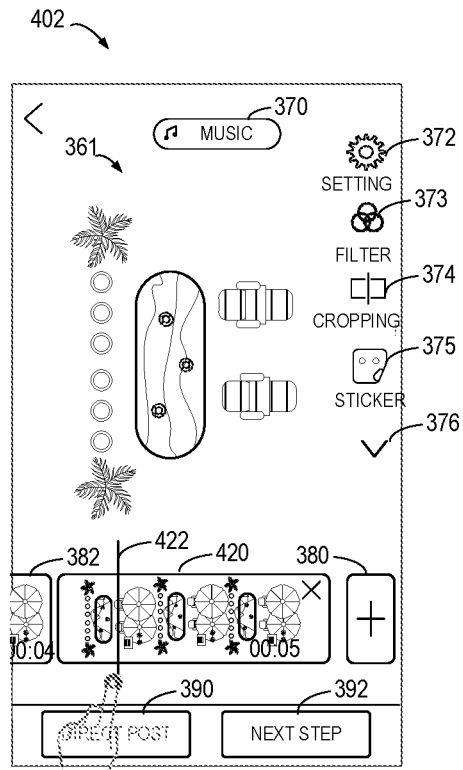

For example, in the editing page 402 of FIG. 4A, in response to detecting a selection indication for the segment identifier 414, a preview window 420 of the video segment 361 as shown in FIG. 4B is presented. In addition, a positioning indicator 422 for the video segment is provided, and the video segment 361 is presented in the editing page 402. The user is allowed to drag the positioning indicator 422 and present the video picture corresponding to the positioning indicator in the editing page 402. The positioning indicator 422 may also be continuously moved as the video segment 361 plays.

Figure 4C:
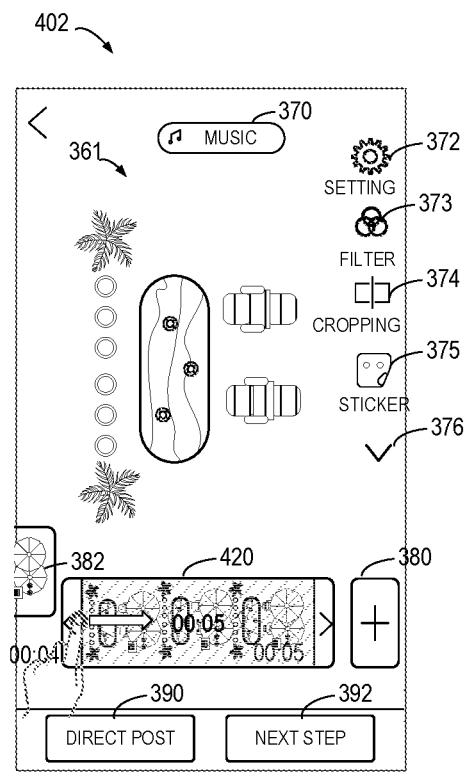
Figure 4D:
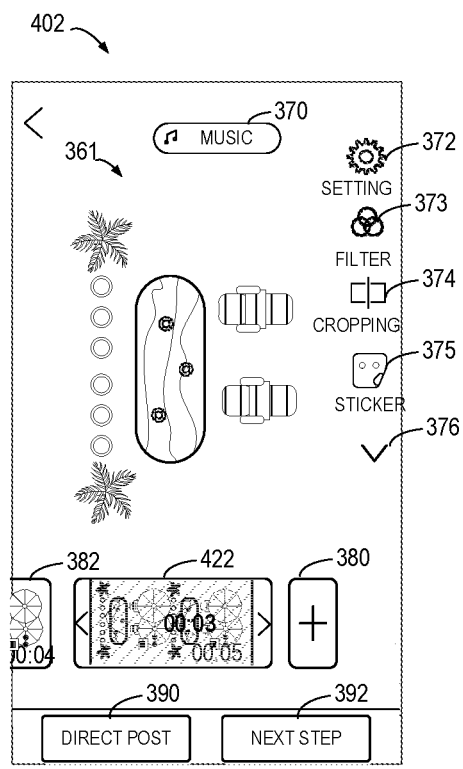

In some embodiments, the length of the video segment may also be allowed to be cropped through the preview window. For example, by moving a start and end positions of the preview window, a start and end of the video segment may be cropped, thus obtaining the desired video length. For example, in FIG. 4C, the user is allowed to crop the video segment 361 from the start position of the video segment 361 by controlling the length of the preview window 420, such as by long-pressing the start position of the preview window and moving to the right. As shown in FIG. 4D, as the start position of the preview window moves, the video length of the video segment 361 may be restricted from 5 seconds to 3 seconds. In FIG. 4D, the preview window 422 corresponding to the cropped video segment 361 is presented in the editing page 402. In other examples, the video segment may be cropped from the end position of the video segment by long-pressing the end position of the preview window and moving it to the left.

Figure 4E:
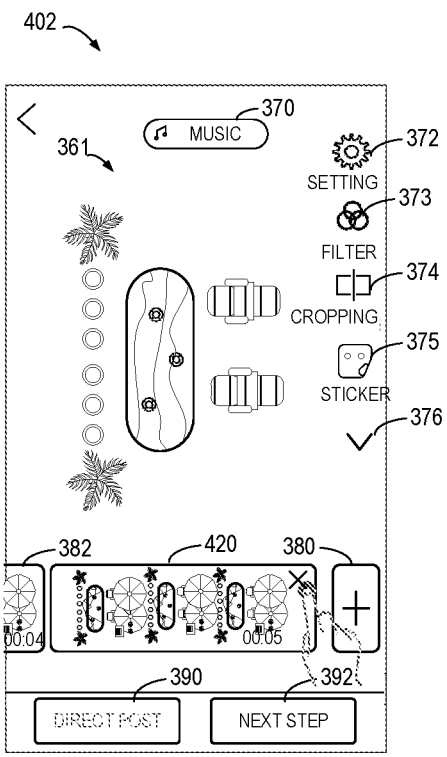
Figure 4F:
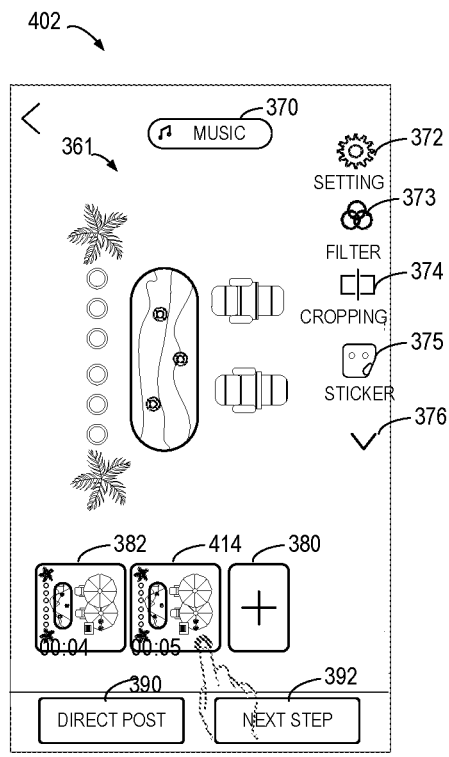

In some embodiments, a video segment corresponding to a segment identifier may be deleted through a deletion indication of the segment identifier. In some examples, a delete function may be provided in the preview window of the video segment. As shown in FIG. 4E, the delete function is provided in the preview window 420, by selecting which a deletion indication may be started to the segment identifier. In some examples, a deletion indication may be started for a segment identifier by performing a deletion operation on the segment identifier, e.g., long-pressing the segment identifier 414 in FIG. 4F.

Figure 4G:
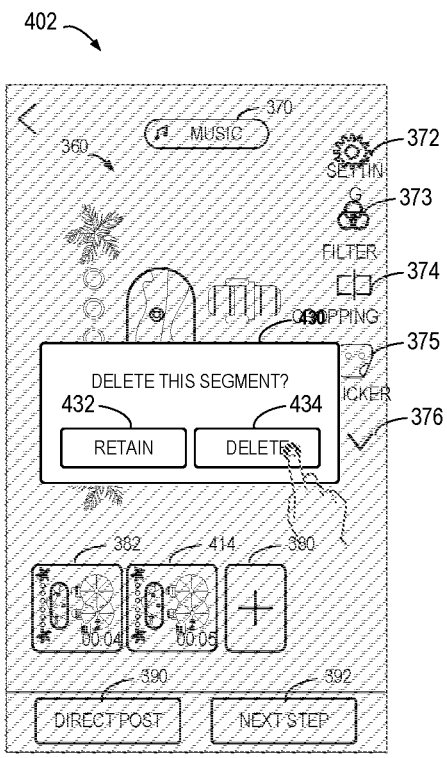
Figure 4H:
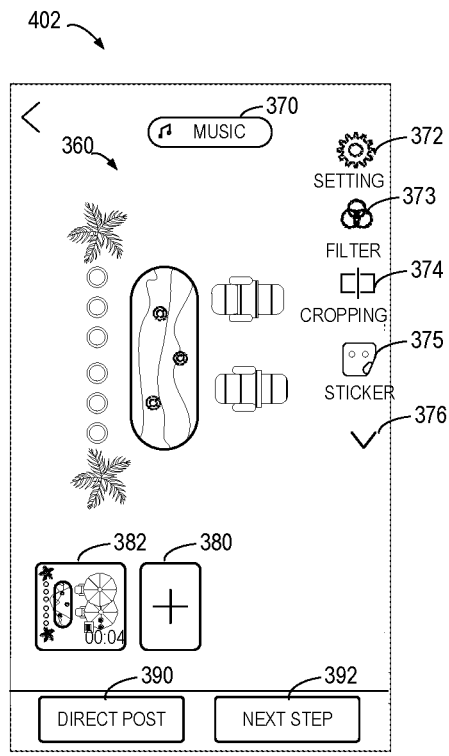

In some embodiments, after detecting a deletion indication for a segment identifier, a deletion confirmation prompt may further be provided, so that the user may confirm whether the corresponding video segment is to be deleted. For example, if a deletion indication for the segment identifier 414 is started in FIG. 4E or FIG. 4F, a deletion confirmation window 430 is displayed in FIG. 4G. The deletion confirmation window 430 provides a "Retain" option 432 and a "Delete" option 434 to be selected by the user as to whether to retain or delete the video segment 361. If the user continues to select the "Delete" option 434, the video segment 361 will be deleted. In the editing page 402 of FIG. 4H, the segment identifier 414 of the video segment 361 is deleted, and the segment identifier of the video segment 360 is provided in the editing page 402 along with the new capturing control 380.

In some embodiments, an editing result of the first video segment is maintained in the first editing page in the second editing page. For example, if an application indication for one or more editing functions is received in the editing page 306 in FIG. 3E, these editing functions may be applied to the video segment 360 captured at that time. The result of such edits may be saved. After capturing the video segment 361 and entering the editing page 402 in FIG. 4A, the editing result of the video segment 360 may be maintained. For example, if a specific filter effect is applied to the video segment 360 in the editing page 306, the specific filter effect is maintained on the video segment 360 in the editing page 402.

In some embodiments, if both the first video segment and the second video segment are edited in the second editing page, and the user triggers an instruction to add a capture, the editing results of the two video segments may be maintained in an editing page to be presented next time. By maintaining the editing result in the previous editing page, it is possible to implement the process of video editing and segmented capturing can be independent of each other.

In some embodiments, in the editing page, e.g., in the second editing page, the editing function may be applied separately to multiple captured video segments. For example, the corresponding video segment may be previewed by selecting the corresponding segment identifier, and the corresponding editing function provided in the editing page may be selected to apply the editing function to the selected video segment. In some embodiments, in the editing page, e.g., in the second editing page, the same editing function is allowed to be uniformly applied to multiple video segments, such as applying the same filter effect to multiple video segments. In some embodiments, the user is allowed to select or confirm whether the same editing function is to be applied to two, more, or all video segments.

Figure 2B:
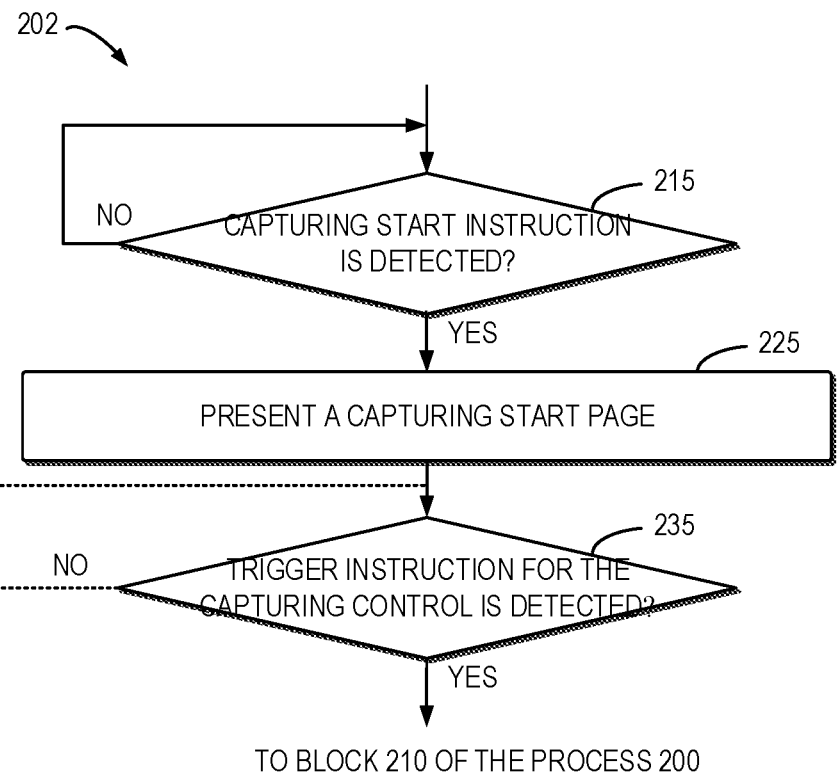
FIG. 2B shows a flowchart of a capturing start process according to some embodiments of the present disclosure.

Note that in the embodiments described above, while the first capturing page is presented after starting the capturing function with reference to FIG. 2B, in other embodiments, the first capturing page may also be a capturing page presented after completing the capturing of one or more video segments, through the indication for new capturing as detected in the editing page (e.g., a capturing page presented in a similar way to the second editing page).

In some embodiments, if the selected target video capturing mode has an upper limit of video duration, or if a default upper limit of video duration is set in the video capturing, in the capturing page (for example, the first capturing page or the second capturing page), the terminal device 110 detects whether the total length of the captured video segment reaches the upper limit of video duration.

In some embodiments, if detecting that the total length of the captured video segments reaches the upper limit of video duration, presenting the first editing page or the second capturing page while the corresponding capturing page (for example, the first capturing page or the second capturing page) is being presented. In some embodiments, if the total length of the captured video segments reaches the upper limit of video duration, a trigger on the indication of new capturing is disabled the presented editing page, i.e., the user is no longer allowed to trigger the capturing of more video segments.

Figure 5A:
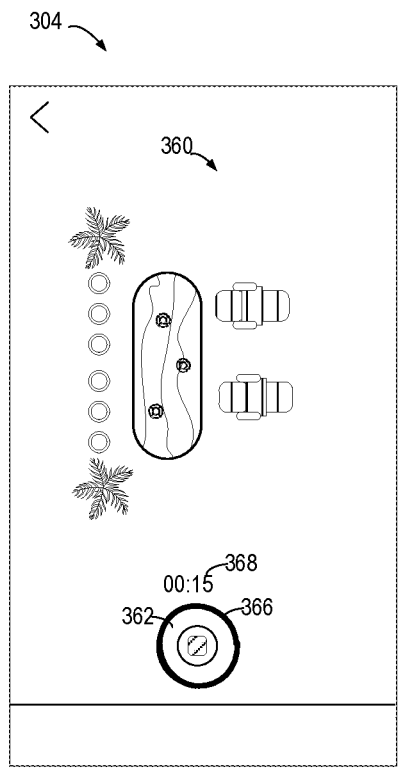
FIG. 5A to FIG. 5D show schematic diagrams of example pages related to content capturing and editing according to other embodiments of the present disclosure.
Figure 5B:
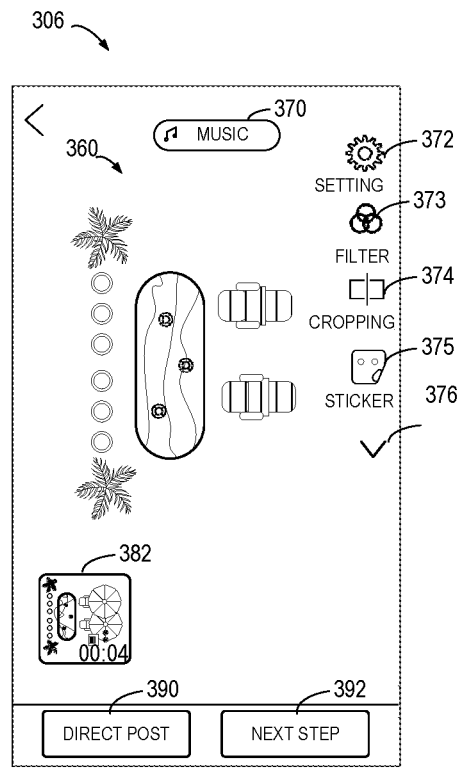

For example, in FIG. 5A, capturing continues in the capturing page 304 where the video segment 360 is captured, until the upper limit of video duration of the current video capturing mode is reached (e.g., 15 seconds). At this point, the page automatically switches to the editing page 306 as shown in FIG. 5B, wherein the captured video segment 360 with a total length of 15 seconds may be edited.

Figure 5C:
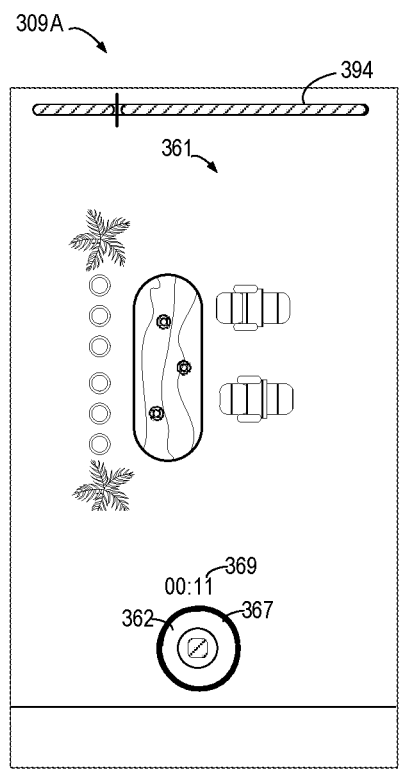
Figure 5D:
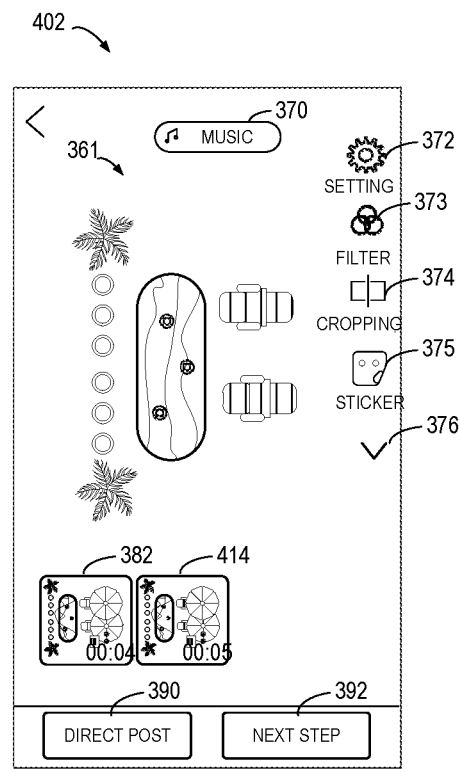

For example, in FIG. 5C, capturing continues in the capturing page 309A where the video segment 361 is captured, until the total duration of the video segment 361 and the previously captured video segment 360 reaches the upper limit of video duration (e.g., 15 seconds). In this example, the progress bar 394 about the total capturing duration indicates that the remaining capturing duration is 0. At this point, the page automatically switches to the editing page 402 as shown in FIG. 5D, wherein the video segments 360 and 361 that have been captured for a total of 15 seconds may be edited.

When the video capturing upper limit is reached, the new capturing control may no longer be provided in the editing page, or the new capturing control may be presented in a non-selectable form, so that the instruction for new capturing cannot be triggered. For example, the new capturing control 380 is no longer provided in the editing pages shown in FIG. 5B and FIG. 5D.

Figure 6:
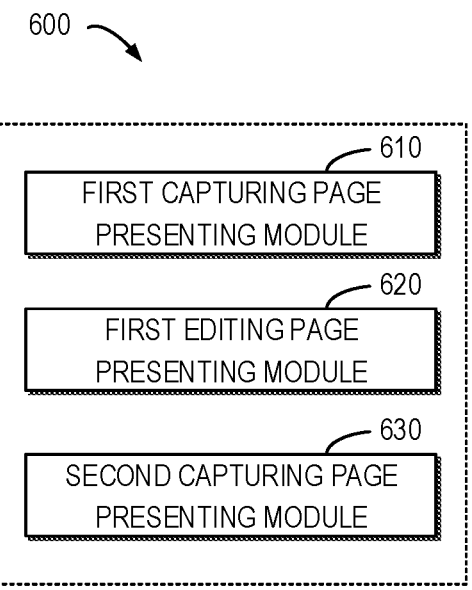
FIG. 6 shows a block diagram of an apparatus for content capturing according to some embodiments of the present disclosure.

FIG. 6 shows a schematic structural block diagram of an apparatus 600 for content capturing according to some embodiments of the present disclosure. The apparatus 600 may be implemented or comprised in the terminal device 110. Each module/component in the apparatus 600 may be implemented by hardware, software, firmware, or any combination thereof.

The apparatus 600 comprises a first capturing page presenting module 610, configured to present a first capturing page corresponding to a single-segment capturing mode to capture a first video segment. The apparatus 600 further comprises a first editing page presenting module 620, configured to, in response to an indication of capturing completion being detected while the first capturing page is being presented, present a first editing page for editing at least the first captured video segment. The apparatus 600 further comprises a second capturing page presenting module 630, configured to presenting a second capturing page to capture a second video segment based on an indication of new capturing being detected while the first editing page is being presented.

In some embodiments, the first capturing page presenting module 610 comprises: a first capturing start page presenting module, configured to, in response to a capturing start instruction, present a first capturing start page, the first capturing start page comprising at least a capturing control; and a first capturing page presenting module triggered based on a control, configured to, in response to a trigger on the capturing control being detected while the first capturing start page is being presented, present the first capturing page.

In some embodiments, the second capturing page presenting module 630 comprises: a second capturing start page presenting module, configured to, in response to detecting the indication of new capturing, present a second capturing start page, the second capturing start page comprising at least a capturing control; and a second capturing page presenting module triggered based on a control, configured to, in response to a trigger on the capturing control being detected while the second capturing start page is being presented, present the second capturing page.

In some embodiments, the second capturing start page presenting module comprises: an alignment identifier presenting module, configured to, in response to an indication of segment alignment being detected while the second capturing start page is being presented, present an alignment identifier in the second capturing start page for alignment to at least one object in the first video segment.

In some embodiments, the apparatus 600 further comprises: a second editing page presenting module, configured to present a second editing page in response to an indication of capturing completion being detected while the second capturing page is being presented, the second editing page being used to at least edit the first captured video segment and the second captured video segment.

In some embodiments, an editing result of the first video segment is maintained in the first editing page in the second editing page.

In some embodiments, the first editing page presenting module is further configured to, in response to detecting that a total length of captured video segments reaches an upper limit of video duration, present the first editing page while the first capturing page is being presented. The second editing page presenting module is further configured to, in response to detecting that the total length of the captured video segments reaches the upper limit of video duration, present the second editing page while the second capturing page is being presented, the second editing page is being used to at least edit the first captured video segment and the second captured video segment.

In some embodiments, a trigger on the indication of new capturing is disabled in the first editing page or the second editing page where the total length of the captured video segments reaches the upper limit of video duration.

In some embodiments, the second capturing page presenting module comprises: an indication presenting module, configured to present at least one of the following indications in the second capturing page: an indication of a remaining capturing duration, which is determined based on a difference between the upper limit of video duration and the total length of the captured video segments, and an indication of a capturing progress of the second video segment.

In some embodiments, the second capturing page presenting module is configured to: present a second capturing page corresponding to the single-segment capturing mode.

In some embodiments, the first editing page presenting module comprises: a segment identifier presenting module, configured to present a first segment identifier of the first video segment in the first editing page; a preview window presenting module, configured to, in response to detecting a selection indication of the first segment identifier, present a preview window of the first video segment; and a positioning presenting module, configured to presents, based on a positioning indicator of the first video segment in the preview window, a video picture of the first video segment corresponding to the positioning indicator in the first editing page.

In some embodiments, the apparatus 600 further comprises: a segment deleting module, configured to, in response to a deletion indication of the first segment identifier, delete the first video segment corresponding to the first segment identifier.

Figure 7:
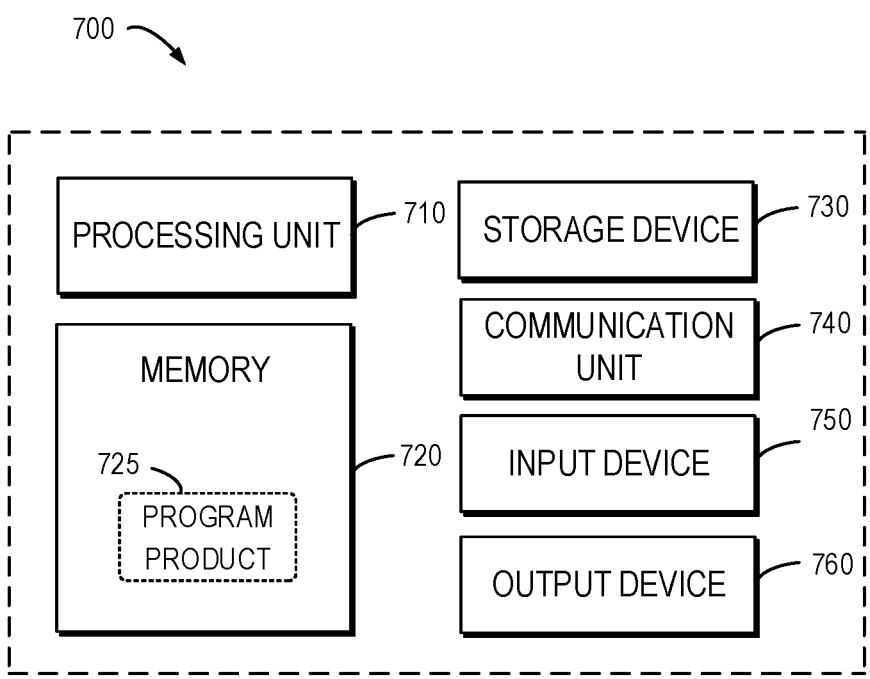
FIG. 7 shows an electronic device capable of implementing one or more embodiments of the present disclosure.

FIG. 7 shows a block diagram of an electronic device 700 in which one or more embodiments of the present disclosure may be implemented. It would be appreciated that the electronic device 700 shown in FIG. 7 is only an example and should not constitute any restriction on the function and scope of the embodiments described herein. The electronic device 700 shown in FIG. 7 may be used to implement the terminal device 110 of FIG. 1.

As shown in FIG. 7, the electronic device 700 is in the form of a general computing device. The components of the electronic device 700 may comprise, but are not limited to, one or more processors or processing units 710, a memory 720, a storage device 730, one or more communication units 740, one or more input devices 750, and one or more output devices 760. The processing unit 710 may be an actual or virtual processor and can execute various processes according to the programs stored in the memory 720. In a multi-processor system, multiple processing units execute computer executable instructions in parallel to improve the parallel processing capability of the electronic device 700.

The electronic device 700 typically comprises a variety of computer storage medium. Such medium may be any available medium that is accessible to the electronic device 700, comprising but not limited to volatile and non-volatile medium, removable, and non-removable medium. The memory 720 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 730 may be any removable or non-removable medium, and may comprise a machine-readable medium, such as a flash drive, a disk, or any other medium, which can be used to store information and/or data (such as training data for training) and can be accessed within the electronic device 700.

The electronic device 700 may further comprise additional removable/non-removable, volatile/non-volatile storage medium. Although not shown in FIG. 7, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 720 may comprise a computer program product 725, which has one or more program modules configured to perform various methods or acts of various embodiments of the present disclosure.

The communication unit 740 communicates with a further computing device through the communication medium. In addition, functions of components in the electronic device 700 may be implemented by a single computing cluster or multiple computing machines, which can communicate through a communication connection. Therefore, the electronic device 700 may be operated in a networking environment using a logical connection with one or more other servers, a network personal computer (PC), or another network node.

The input device 750 may be one or more input devices, such as a mouse, a keyboard, a trackball, etc. The output device 760 may be one or more output devices, such as a display, a speaker, a printer, etc. The electronic device 700 may also communicate with one or more external devices (not shown) through the communication unit 740 as required. The external device, such as a storage device, a display device, etc., communicate with one or more devices that enable users to interact with the electronic device 700, or communicate with any device (for example, a network card, a modem, etc.) that makes the electronic device 700 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions or the computer program is executed by the processor to implement the method described above.

According to example implementation of the present disclosure, a computer program product is also provided. The computer program product is physically stored on a non-transient computer-readable medium and comprises computer-executable instructions, which are executed by the processor to implement the method described above.

Various aspects of the present disclosure are described herein with reference to the flow chart and/or the block diagram of the method, the device, the equipment, and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers, or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions comprises a product, which comprises instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment, or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is exemplary, not exhaustive, and is not limited to the disclosed implementations. Without departing from the scope and spirit of the described implementations, many modifications and changes are obvious to ordinary skill in the art. The selection of terms used in this article aims to best explain the principles, practical application, or improvement of technology in the market of each implementation, or to enable other ordinary skill in the art to understand the various implementations disclosed herein.

What is claimed is:

1. A method of content capturing, comprising:
presenting a first capturing page corresponding to a single-segment capturing mode to capture a first video segment;
in response to an indication of capturing completion being detected while the first capturing page is being presented, presenting a first editing page for editing at least the first captured video segment, wherein the first editing page comprises a new capturing control, and a trigger on the new capturing control triggers an indication for new capturing, so that a video segment is to be captured in a multi-segment capturing mode; and
in response to detecting the indication of new capturing in the first editing page, presenting a second capturing page corresponding to the multi-segment capturing mode to capture a second video segment, wherein the second capturing page is different from the first capturing page, and the first video segment and the second video segment are associated with a video captured in multi-segment capturing mode.

2. The method of claim 1, wherein presenting the first capturing page comprises:
in response to a capturing start instruction, presenting a first capturing start page, the first capturing start page comprising at least a capturing control; and
in response to a trigger on the capturing control being detected while the first capturing start page is being presented, presenting the first capturing page.

3. The method of claim 1, wherein presenting the second capturing page comprises:
in response to detecting the indication of new capturing, presenting a second capturing start page, the second capturing start page comprising at least a capturing control; and
in response to a trigger on the capturing control being detected while the second capturing start page is being presented, presenting the second capturing page.

4. The method of claim 3, wherein presenting the second capturing start page comprises:
in response to an indication of segment alignment being detected while the second capturing start page is being presented, presenting an alignment identifier in the second capturing start page for alignment to at least one object in the first video segment.

5. The method of claim 1, further comprising:
presenting a second editing page in response to an indication of capturing completion being detected while the second capturing page is being presented, the second editing page being used to at least edit the first captured video segment and the second captured video segment.

6. The method of claim 5, wherein an editing result of the first video segment is maintained in the first editing page in the second editing page.

7. The method of claim 1, further comprising:
in response to detecting that a total length of captured video segments reaches an upper limit of video duration, presenting the first editing page while the first capturing page is being presented; or
in response to detecting that the total length of the captured video segments reaches the upper limit of video duration, presenting the second editing page while the second capturing page is being presented, the second editing page is being used to at least edit the first captured video segment and the second captured video segment.

8. The method of claim 7, wherein a trigger on the indication of new capturing is disabled in the first editing page or the second editing page where the total length of the captured video segments reaches the upper limit of video duration.

9. The method of claim 7, wherein presenting the second capturing page comprises:
presenting at least one of the following indications in the second capturing page:
an indication of a remaining capturing duration, which is determined based on a difference between the upper limit of video duration and the total length of the captured video segments, and
an indication of a capturing progress of the second video segment.

10. The method of claim 1, wherein presenting the second capturing page comprises:
presenting a second capturing page corresponding to the single-segment capturing mode.

11. The method of claim 1, wherein presenting the first editing page comprises:
presenting a first segment identifier of the first video segment in the first editing page;
in response to detecting a selection indication of the first segment identifier, presenting a preview window of the first video segment; and
presenting, based on a positioning indicator of the first video segment in the preview window, a video picture of the first video segment corresponding to the positioning indicator in the first editing page.

12. The method of claim 11, further comprising:
in response to a deletion indication of the first segment identifier, deleting the first video segment corresponding to the first segment identifier.

13. An electronic device, comprising:
at least one processing unit; and
at least one memory coupled to the at least one processing unit and storing instructions to be executed by the at least one processing unit, the instructions, when executed by the at least one processing unit, causing the electronic device to perform acts comprising:
presenting a first capturing page corresponding to a single-segment capturing mode to capture a first video segment;
in response to an indication of capturing completion being detected while the first capturing page is being presented, presenting a first editing page for editing at least the first captured video segment, wherein the first editing page comprises a new capturing control, and a trigger on the new capturing control triggers an indication for new capturing, so that a video segment is to be captured in a multi-segment capturing mode; and
in response to detecting the indication of new capturing in the first editing page, presenting a second capturing page corresponding to the multi-segment capturing mode to capture a second video segment, wherein the second capturing page is different from the first capturing page, and the first video segment and the second video segment are associated with a video captured in multi-segment capturing mode.

14. The electronic device of claim 13, wherein presenting the first capturing page comprises:
in response to a capturing start instruction, presenting a first capturing start page, the first capturing start page comprising at least a capturing control; and
in response to a trigger on the capturing control being detected while the first capturing start page is being presented, presenting the first capturing page.

15. The electronic device of claim 13, wherein presenting the second capturing page comprises:
in response to detecting the indication of new capturing, presenting a second capturing start page, the second capturing start page comprising at least a capturing control; and
in response to a trigger on the capturing control being detected while the second capturing start page is being presented, presenting the second capturing page.

16. The electronic device of claim 15, wherein presenting the second capturing start page comprises:
in response to an indication of segment alignment being detected while the second capturing start page is being presented, presenting an alignment identifier in the second capturing start page for alignment to at least one object in the first video segment.

17. The electronic device of claim 13, wherein the acts further comprise:
presenting a second editing page in response to an indication of capturing completion being detected while the second capturing page is being presented, the second editing page being used to at least edit the first captured video segment and the second captured video segment.

18. The electronic device of claim 17, wherein an editing result of the first video segment is maintained in the first editing page in the second editing page.

19. The electronic device of claim 13, wherein the acts further comprise:
in response to detecting that a total length of captured video segments reaches an upper limit of video duration, presenting the first editing page while the first capturing page is being presented; or
in response to detecting that the total length of the captured video segments reaches the upper limit of video duration, presenting the second editing page while the second capturing page is being presented, the second editing page is being used to at least edit the first captured video segment and the second captured video segment.

20. A non-transitory computer-readable storage medium having a computer program stored thereon, the computer program, when executed by a processor, implementing acts comprising:
presenting a first capturing page corresponding to a single-segment capturing mode to capture a first video segment;
in response to an indication of capturing completion being detected while the first capturing page is being presented, presenting a first editing page for editing at least the first captured video segment, wherein the first editing page comprises a new capturing control, and a trigger on the new capturing control triggers an indication for new capturing, so that a video segment is to be captured in a multi-segment capturing mode; and
in response to detecting the indication of new capturing in the first editing page, presenting a second capturing page corresponding to the multi-segment capturing mode to capture a second video segment, wherein the second capturing page is different from the first capturing page, and the first video segment and the second video segment are associated with a video captured in multi-segment capturing mode.

* * * * *